(12) United States Patent
Toyoda et al.

(10) Patent No.: US 8,747,578 B2
(45) Date of Patent: Jun. 10, 2014

(54) STEEL FOR STRUCTURAL PART OF AUTOMOBILE AND METHOD FOR PRODUCING THE SAME

(75) Inventors: Shunsuke Toyoda, Aichi (JP); Kei Sakata, Aichi (JP); Akio Sato, Aichi (JP); Kouichi Kaneko, Anjo (JP); Hiroshi Kawaguchi, Okazaki (JP)

(73) Assignees: JFE Steel Corporation (JP); Toyota Jidosha Kabushiki Kaisha (JP)

( * ) Notice: Subject to any disclaimer, the term of this patent is extended or adjusted under 35 U.S.C. 154(b) by 1013 days.

(21) Appl. No.: 10/582,717

(22) PCT Filed: Dec. 9, 2004

(86) PCT No.: PCT/JP2004/018776
§ 371 (c)(1),
(2), (4) Date: Jun. 12, 2006

(87) PCT Pub. No.: WO2005/056856
PCT Pub. Date: Jun. 23, 2005

(65) Prior Publication Data
US 2007/0144632 A1    Jun. 28, 2007

(30) Foreign Application Priority Data
Dec. 12, 2003   (JP) .................. 2003-414336

(51) Int. Cl.
*C22C 38/44*   (2006.01)
(52) U.S. Cl.
USPC ........... 148/335; 148/330; 420/106; 420/109; 420/121; 420/124
(58) Field of Classification Search
USPC ................ 148/400, 300, 306, 307, 310, 320, 148/333–336; 420/8, 89–93, 104–112, 119, 420/121, 123–127
See application file for complete search history.

(56) References Cited

U.S. PATENT DOCUMENTS 5,181,974 A     1/1993  Tanabe et al.
6,632,296 B2 *  10/2003 Yoshinaga et al. ............ 148/320
(Continued)

FOREIGN PATENT DOCUMENTS

EP   0 940 476    9/1999
EP   1 367 143    12/2003
(Continued)

OTHER PUBLICATIONS

Computer-Generated Translation of JP 2003-321748, published originally on Nov. 14, 2003 in the Japanese language.*
(Continued)

*Primary Examiner* — Scott Kastler
*Assistant Examiner* — Vanessa Luk
(74) *Attorney, Agent, or Firm* — DLA Piper LLP (US)

(57) ABSTRACT

A steel having excellent formability, fatigue endurance after quenching, low temperature toughness, resistance for hydrogen embrittlement, and corrosion fatigue endurance. A method includes heating a steel slab at 1160° C. to 1320° C., hot-finish-rolling the steel slab at a finisher delivery temperature of 750° C. to 980° C., and then coiling the hot-rolled steel at a coiling temperature of 560° C. to 740° C. after slow cooling for a time of 2 seconds or more to produce a hot-rolled steel strip having a structure in which the ferrite grain diameter df corresponding to a circle is 1.1 μm to less than 1.2 μm and the ferrite volume fraction Vf is 30% to 98%, the steel slab containing 0.18 to 0.29% of C, 0.06 to 0.45% of Si, 0.91 to 1.85% of Mn, 0.019% or less of P, 0.0029% or less of S, 0.015 to 0.075% of sol. Al, 0.0049% or less of N, 0.0049% or less of O, 0.0001 to 0.0029% of B, 0.001 to 0.019% of Nb, 0.001 to 0.029% of Ti, 0.001 to 0.195% of Cr, and 0.001 to 0.195% of Mo so that the carbon equivalent Ceq satisfies a value of 0.4 to less than 0.58, and the total x of multiplying factors including that for B according to Grossmann satisfies a value of 1.2 to less than 1.7.

6 Claims, 3 Drawing Sheets

(56) References Cited

U.S. PATENT DOCUMENTS

| | | | |
|---|---|---|---|
| 2002/0079028 A1* | 6/2002 | Yoshii et al. | 148/648 |
| 2003/0106620 A1* | 6/2003 | Nagataki et al. | 148/533 |
| 2003/0116238 A1* | 6/2003 | Fujita et al. | 148/593 |
| 2004/0202889 A1* | 10/2004 | Fujita et al. | 428/659 |

FOREIGN PATENT DOCUMENTS

| | | | |
|---|---|---|---|
| JP | 04063227 | | 2/1992 |
| JP | 05043980 | | 2/1993 |
| JP | 05051692 | | 3/1993 |
| JP | 06-264162 | | 9/1994 |
| JP | 7-188858 | | 7/1995 |
| JP | 7-74382 | B2 | 8/1995 |
| JP | 2605171 | B2 | 2/1997 |
| JP | 10-88278 | | 4/1998 |
| JP | 2000-248338 | | 9/2000 |
| JP | 2000-248338 | A | 9/2000 |
| JP | 2000-248831 | | 9/2000 |
| JP | 2000-248831 | A | 9/2000 |
| JP | 3111861 | B2 | 9/2000 |
| JP | 2002-266022 | * | 9/2002 |
| JP | 3374659 | | 11/2002 |
| JP | 3374659 | B2 | 11/2002 |
| JP | WO02/101112 A2 * | 12/2002 | ............ C23C 2/02 |
| JP | 2003-138316 | A | 5/2003 |
| JP | 2003138316 | | 5/2003 |
| JP | 2003-321748 | | 11/2003 |
| WO | WO 02/070767 A1 | | 9/2002 |

OTHER PUBLICATIONS

B. W. Busch et al., "Medium-energy ion scattering study of arsenic and sulfur segregation to the Fe-9% W(100) surface," Surface Science, 463 (2000), pp. 145-155.*

* cited by examiner

STEEL FOR STRUCTURAL PART OF AUTOMOBILE AND METHOD FOR PRODUCING THE SAME

RELATED APPLICATION

This is a §371 of International Application No. PCT/JP2004/018776, with an international filing date of Dec. 9, 2004 (WO 2005/056856 A1, published Jun. 23, 2005), which is based on Japanese Patent Application No. 2003-414336, filed Dec. 12, 2003.

TECHNICAL FIELD

The invention relates to steels suitably used for structural parts of automobiles and a method for producing the same. The disclosure also relates to improvements in formability, fatigue endurance after quenching, low temperature toughness, and resistance for hydrogen embrittlement of steels used as materials for forming and quenching suspension arms and axle beams. The term "steel" includes steel strips and steel tubes.

BACKGROUND

JP 7-74382 discloses a method for producing hot-rolled steels for body-reinforcing electric resistance welded tubes by induction hardening. The technique disclosed in JP 7-74382 can produce body-reinforcing electric resistance welded tubes required to have high strength, such as door guard beams and bumper reinforcements, which have high energy absorbability due to induction hardening. However, that technique has the problem of failing to achieve formability, fatigue endurance after quenching, and low temperature toughness required for suspension and chassis members.

JP 2000-248338 discloses steel sheets for induction hardening and induction-hardened reinforcing members, which have excellent hardenability, hardened portions with toughness, and excellent high energy absorbability, and a method for producing these. The technique disclosed in JP 2000-248338 can produce body-reinforcing members, such as center pillars and bumper reinforcements, which have excellent high impact energy absorbability due to induction hardening. However, that technique has the problem of failing to achieve fatigue endurance after quenching and low temperature toughness which are required for suspension and chassis members.

JP 2605171 discloses high toughness electric resistance welded tubes for heat treatment which can impart high strength and toughness by heat treatment. The technique disclosed in JP 2605171 can produce automobile door reinforcements made from steel tubes by, for example, quenching after induction heating, the reinforcements having high strength and excellent low temperature toughness. However, that technique has the problem of failing to achieve fatigue endurance, resistance for hydrogen embrittlement, and corrosion fatigue endurance required for suspension and chassis members.

JP 2000-248331 discloses low alloyed steel sheets having excellent properties of heat treatment by irradiation of a high energy density beam, high fatigue endurance after quenching, and high workability. The technique disclosed in JP 2000-248331 can improve local fatigue endurance. However, that technique has the problem of failing to secure fatigue endurance required over the wholes of suspension and chassis members and to achieve resistance for hydrogen embrittlement and corrosion fatigue endurance required for these members.

WO 02/070767 A1 discloses electric resistance welded tubes for hollow stabilizers which have excellent workability. The technique disclosed in WO 02/070767 A1 can produce electric resistance welded tubes for hollow stabilizers having homogeneous metal structures in electric resistance welded portions and matrix portions and excellent workability due to induction heating and diameter reduction rolling of the electric resistance welded tubes. However, that technique has the problem of failing to achieve fatigue endurance, resistance for hydrogen embrittlement, and corrosion fatigue endurance required for suspension and chassis members.

JP 3111861, JP 3374659 and JP 2003-138316 disclose high tension electric resistance welded tubes which have excellent resistance for hydrogen embrittlement. The techniques include increasing tensile strength of steel strips and then forming tubes to produce high tension steel tubes having excellent resistance for hydrogen embrittlement. However, those techniques have the problem of failing to achieve formability and fatigue endurance required for suspension and chassis members.

It would therefore be advantageous to provide a steel having excellent formability, excellent fatigue endurance after quenching, excellent low temperature toughness, excellent resistance for hydrogen embrittlement, and excellent corrosion fatigue endurance for suspension and chassis members, and a technique for producing the steel.

SUMMARY (1) A steel for structural parts of automobiles having excellent formability, fatigue endurance after quenching, low temperature toughness, and resistance for hydrogen embrittlement is disclosed, the steel having a composition containing, by mass, 0.18 to 0.29% of C, 0.06 to 0.45% of Si, 0.91 to 1.85% of Mn, 0.019% or less of P, 0.0029% or less of S, 0.015 to 0.075% of sol. Al, 0.0049% or less of N, 0.0049% or less of O, 0.0001 to 0.0029% of B, 0.001 to 0.019% of Nb, 0.001 to 0.029% of Ti, 0.001 to 0.195% of Cr, and 0.001 to 0.195% of Mo so that the carbon equivalent Ceq defined by the following equation (1):

$$Ceq = C + Mn/6 + Si/24 + Ni/40 + Cr/5 + Mo/4 + V/14 \quad (1)$$

(wherein C, Mn, Si, Ni, Cr, Mo, and V represent the contents (% by mass) of the respective elements) satisfies a value of 0.4 to less than 0.58, and the total x of multiplying factors including that for B according to Grossmann satisfies a value of 1.2 to less than 1.7, the balance being substantially composed of Fe, and the steel having a structure in which the ferrite grain diameter df corresponding to a circle is 1.1 µm to less than 12 µm, and the ferrite volume fraction Vf is 30% to less than 98%.

(2) The steel (1) for structural parts of automobiles further containing, by mass, at least one selected from 0.001 to 0.175% of Cu, 0.001 to 0.145% of Ni, and 0.001 to 0.029% of V in addition to the above composition.

(3) The steel (1) or (2) for structural parts of automobiles further containing 0.0001 to 0.0029% by mass of Ca in addition to the above composition.

(4) A method for producing a steel for structural parts of automobiles having excellent formability, fatigue endurance after quenching, low temperature toughness, and resistance for hydrogen embrittlement, the method including heating a steel slab at 1160° C. to 1320° C., hot-finish-rolling the steel slab at a finisher delivery temperature of 750° C. to 980° C., and then coiling the not-rolled steel at a coiling temperature of 560° C. to 740° C. after slow cooling for a time of 2 seconds or more to produce a hot-rolled steel strip, wherein the steel slab has a composition containing, by mass, 0.18 to 0.29% of C, 0.06 to 0.45% of Si, 0.91 to 1.85% of Mn, 0.019% or less of P, 0.0029% or less of S, 0.015 to 0.075% of sol. Al, 0.0049% or less of N, 0.0049% or less of O, 0.0001 to 0.0029% of B, 0.001 to 0.019% of Nb, 0.001 to 0.029% of Ti, 0.001 to 0.195% of Cr, and 0.001 to 0.195% of Mo so that the carbon equivalent Ceq defined by the following equation (1):

$$Ceq=C+Mn/6+Si/24+Ni/40+Cr/5+Mo/4+V/14 \qquad (1)$$

(wherein C, Mn, Si, Ni, Cr, Mo, and V represent the contents (% by mass) of the respective elements) satisfies a value of 0.4 to less than 0.58, and the total x of multiplying factors including that for B according to Grossmann satisfies a value of 1.2 to less than 1.7, the balance being preferably composed of Fe.

(5) The method (4) for producing a steel for structural parts of automobiles, wherein the steel slab further contains, by mass, at least one selected from 0.001 to 0.175% of Cu, 0.001 to 0.145% of Ni, and 0.001 to 0.029% of V in addition to the above composition.

(6) The method (4) or (5) for producing a steel for structural parts of automobiles, wherein the steel slab further contains 0.0001 to 0.0029% by mass of Ca in addition to the above composition.

(7) A method for producing a steel tube for structural parts of automobiles having excellent formability, fatigue endurance after quenching, low temperature toughness, and resistance for hydrogen embrittlement, the method including making a tube from the hot-rolled steel strip by electric resistance welded tube making with a width reduction of hoop of 8% or less, the hot-rolled steel strip being produced by any one of the methods (4) to (6) and used as a raw material immediately after hot rolling or after pickling of the hot-rolled steel strip.

DETAILED DESCRIPTION

Figure 1:
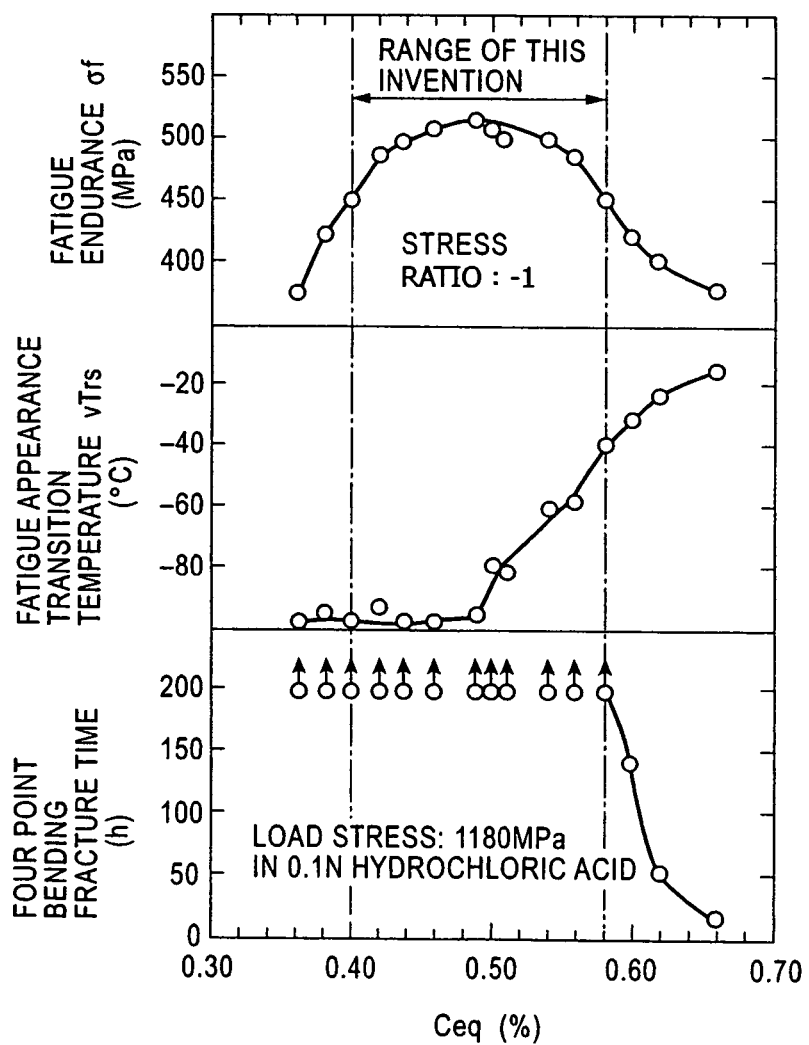
FIG. 1 is a graph showing the influences of carbon equivalent on the failure time in a four-point bending test in 0.1N hydrochloric acid after quenching, the fracture appearance transition temperature in a Charpy impact test, and the fatigue endurance in a completely reversed plane bending fatigue test.

In the text below, the term "excellent formability" means that a tensile test using a specimen of JIS No. 12 shows an elongation El of 20% or more. The term "excellent fatigue endurance after quenching" means that the maximum stress amplitude of causing no fatigue failure in a completely reversed plane bending fatigue endurance test (stress ratio: −1.0) is 450 MPa or more. The term "excellent low temperature toughness" means that the fracture appearance transition temperature vTrs in a Charpy impact test (specimens: ¼ size, 2 mm V-notch) is −40° C. or less. The term "excellent resistance for hydrogen embrittlement" means that the failure time in a four-point bending test (load stress: 1180 MPa) in 0.1N hydrochloric acid is 200 hours or more. The term "excellent corrosion fatigue endurance" means that the fatigue life in a completely reversed plane bending fatigue test (stress ration: −1) after a corrosion test is ½ or more of the number of cycles in a case without corrosion.

The reasons for selecting the chemical component ranges will be described. In the composition below, "% by mass" is simply shown by "%".

C: 0.18 to 0.29%

C is an element necessary for securing fatigue endurance after quenching. However, at a C content of less than 0.18%, it is difficult to secure desired fatigue endurance, while at a C content exceeding 0.29%, resistance for hydrogen embrittlement degrades. Therefore, the C content is in a range of about 0.18% to about 0.29%. The C content is preferably 0.18% to 0.24%.

Si: 0.06% to 0.45%

Si is an element for accelerating ferrite transformation in a hot rolling step. To secure a ferrite volume fraction necessary for securing formability before quenching, the Si content must be 0.06% or more. At a Si content of less than 0.06%, the ferrite volume fraction becomes insufficient and formability degrades, while at a Si content exceeding 0.45%, the electric resistance weldability degrades, and the low-temperature toughness after quenching also degrades. Therefore, the Si content is in a range of about 0.06% to about 0.45%. The Si content is preferably 0.15% to 0.35%.

Mn: 0.91% to 1.85%

Mn is an element for suppressing ferrite transformation in a quenching step. To secure fatigue endurance after quenching which is required for a more than 90% tempered martensite structure, the Mn content must be 0.91% or more. At a Mn content of less than 0.91%, a ferrite structure appears in a surface layer during quenching to fail to achieve desired fatigue endurance. On the other hand, at a Mn content exceeding 1.85%, the martensite transformation temperature (Ms point) of the steel decreases, and self-tempering (precipitation of micro carbide) of martensite in a quenching step is suppressed to increase the quenching strain of a quenched member and degrade resistance for hydrogen embrittlement. Therefore, the Mn content is in a range of about 0.90% to about 1.85%. The Mn content is preferably over about 1.0% to about 1.6%.

P: 0.019% or less

P is an element which segregates at austenite boundaries during quench and heating or segregates at boundaries between cementite and ferrite matrixes during cementite precipitation in a step of tempering martensite, thereby degrading low temperature toughness and resistance for hydrogen embrittlement. At a P content exceeding 0.019%, the adverse effect becomes significant. Therefore, the P content is about 0.019% or less. The P content is preferably about 0.014% or less.

S: 0.0029% or less

S remains as an elongated MnS inclusion in steel to decrease formability, low temperature toughness, and fatigue endurance. In addition, S functions as an anode in corrosion under coating to accelerate local corrosion and entrance of hydrogen, thereby significantly decreasing resistance for hydrogen embrittlement and corrosion fatigue endurance. At a S content exceeding 0.0029%, the adverse effect becomes significant. Therefore, the upper limit of the S content is about 0.0029% and preferably about 0.0020%.

Sol. Al: 0.015% to 0.075%

Al is a deoxidizing element in steel making and an element for suppressing the growth of austenite grains in a hot-rolling step. To obtain a desired structure and grain diameter in combination with hot-rolling conditions, the sol. Al content must be 0.015% or more. At a sol. Al content of less than 0.015%, the above-described effect is not exhibited, while at a sol. Al content exceeding 0.075%, the effect is saturated, and an oxide inclusion is increased to degrade the production properties and fatigue endurance. Therefore, the sol. Al content is about 0.015% to about 0.075%.

N: 0.0049% or less

N bonds to Ti and precipitates as TiN, but a variation thereof becomes a variation in surplus dissolved Ti, resulting in variations in strength and properties. Therefore, the content range must be strictly specified. At a N content exceeding 0.0049%, low temperature toughness degrades due to the precipitation of excessive TiN. Therefore, the upper limit of the N content is about 0.0049%.

O: 0.0049% or less

O mainly remains as an inclusion in steel and decreases formability and fatigue endurance. At an O content exceeding 0.0049%, the adverse effect becomes significant. Therefore, the upper limit of the O content is about 0.0049%. The O content is preferably about 0.0020% or less.

B: 0.0001% to 0.0029%

B is an element necessary for securing hardenability without degrading resistance for hydrogen embrittlement. This effect is exhibited at a B content of 0.0001% or more. On the other hand, at a B content exceeding 0.0029%, the resistance for hydrogen embrittlement degrades. Therefore, the B content is about 0.0001% to about 0.0029%. The B content is preferably about 0.0008% to about 0.0018%.

Nb: 0.001% to 0.019%

Nb is an element which can make a fine structure in a hot-rolling step to form a desired structure and grain diameter due to a synergistic effect with AlN and which can suppress the growth of austenite grains during heating after forming to improve low temperature toughness after quenching. These effects are exhibited even at a low content of 0.001% or more, but formability before quenching degrades at a content exceeding 0.019%. Therefore, the Nb content is in a range of about 0.001% to about 0.019%.

Ti: 0.001% to 0.029%

Ti bonds to N and preferentially precipitates as TiN to effectively leave dissolved B, thereby contributing to the securement of hardenability. Furthermore, Ti decreases dissolved N to contribute to the securement of formability before quenching. These effects are exhibited at a content of 0.001% or more, but the formability before quenching and low temperature toughness degrade at a content exceeding 0.0029%. Therefore, the Ti content is in a range of about 0.001% to about 0.029%.

Cr: 0.001% to 0.195%

Cr is an element for improving hardenability and is contained for complementing the functions of Mn and B in the present invention. Also, a decrease in the Ms point due to the addition of Cr is lower than that by Mn, and thus Cr can suppress quenching strain. In addition, Cr hardly co-segregates with P at an austenite boundary during quenching and heating, and thus the addition of Cr has a small adverse effect on the resistance for hydrogen embrittlement. These effects are expressed at a content of 0.001% or more, but formability before quenching degrades at a content exceeding 0.195%. Therefore, the Cr content is about 0.001% to about 0.195%.

Mo: 0.001% to 0.195%

Mo is an element for improving hardenability to complement the functions of Mn and B and decrease the potential of C in steel, thereby suppressing surface decarbonization during quenching and heating and significantly improving fatigue endurance after quenching. These effects are expressed at a content of 0.001% or more, but formability before quenching degrades at a content exceeding 0.195%. Therefore, the Mo content is about 0.001% to about 0.195%.

Besides the above-described basic composition, at least one selected from 0.001% to 0.175% of Cu, 0.001% to 0.145% of Ni, and 0.001% to 0.029% of V and/or 0.0001% to 0.0029% of Ca may be further contained.

Any one of Cu, Ni, and V is an element for improving resistance for hydrogen embrittlement and low temperature toughness, and at least one selected from these elements may be contained according to demand.

Cu: 0.001% to 0.175%

Cu is an element having the effect of suppressing the progress of corrosion by concentration as a metal element in a surface layer, particularly in a MnS anode portion, with the progress of corrosion, and the effect of suppressing the entrance of hydrogen into steel to improve resistance for hydrogen embrittlement. Cu may be added according to demand. At a content of 0.001% or more, these effects are expressed, but, at a content exceeding 0.175%, the problem of producing surface scars due to melted Cu during hot rolling increases. Therefore, the Cu content is preferably about 0.001% to about 0.175%.

Ni: 0.001% to 0.145%

Ni is an element having the effect of improving a strength-toughness balance and the effect of improving resistance for hydrogen embrittlement by concentration in a surface layer, and Ni may be contained according to demand. At a content of 0.001% or more, these effects are expressed, but, at a content exceeding 0.145%, austenite-ferrite transformation is suppressed during hot rolling, thereby failing to obtain a desired structure and decreasing formability before quenching. Therefore, the Ni content is preferably about 0.001% to about 0.145%.

V: 0.001% to 0.029%

V is an element having the function to complement the effect of Nb and may be contained according to demand. At a content of 0.001% or more, this effect is expressed, but, at a content exceeding 0.029%, formability before quenching degrades. Therefore, the V content is preferably about 0.001% to about 0.029%.

Besides the above-descried composition, 0.0001% to 0.0029% of Ca may be further contained.

Ca: 0.0001% to 0.0029%

Ca is an element which precipitates as granular CaS in steel to decrease the amount of an elongated MnS inclusion, thereby improving formability, low temperature toughness, fatigue endurance, resistance for hydrogen embrittlement, and corrosion fatigue endurance, and Ca may be contained according to demand. At a content of 0.0001% or more, this effect is expressed, but, at a content exceeding 0.0029%, the adverse effect of a CaO inclusion on these properties becomes significant. Therefore, the Ca content is preferably about 0.0001% to about 0.0029%.

The above-described components are contained in the respective above-descried ranges so that the carbon equivalent Ceq defined by the following equation (1):

$$Ceq = C + Mn/6 + Si/24 + Ni/40 + Cr/5 + Mo/4 + V/14 \quad (1)$$

(wherein C, Mn, Si, Ni, Cr, Mo, and V represent the contents (% by mass) of the respective elements) satisfies a value of 0.4 to less than 0.58, and the total x of multiplying factors including that for B according to Grossmann satisfies a value of 1.2 to less than 1.7.

Carbon equivalent Ceq: 0.4 to less than 0.58

When the carbon equivalent is less than 0.4, the desired hardening penetration and fatigue endurance cannot be obtained. On the other hand, when the carbon equivalent is 0.58 or more, resistance for hydrogen embrittlement after quenching and low temperature toughness degrade. Therefore, the carbon equivalent Ceq is 0.4 to less than 0.58, and preferably 0.44 to 0.54. A calculation according to the equation (1) is performed on the assumption that a value of an absent element is zero.

FIG. 1 shows the relations between the carbon equivalent Ceq and the four-point bending failure time in 0.1N hydrochloric acid after quenching, the fracture appearance transition temperature vTrs in a Charpy impact test, and completely reversed plane bending fatigue endurance σf. FIG. 1 indicates that when Ceq is 0.4 to less than 0.58, the steel is excellent in all the resistance for hydrogen embrittlement after quenching, the low temperature toughness, and the fatigue endurance.

A four-point bending test was carried out using a specimen of 5 mm in width and 80 mm in length which was cut out from a formed and quenched member. In the four-point bending test, the specimen was immersed in 0.1N hydrochloric acid and tested for a time of 200 hours at a maximum with a load stress σ of 1180 MPa to determine the failure time and evaluate the resistance for hydrogen embrittlement. The load stress was calculated according to the following equation:

$$\sigma(MPa) = (12Et\delta)/(3H^2 - 4A^2)$$

Figure 2:
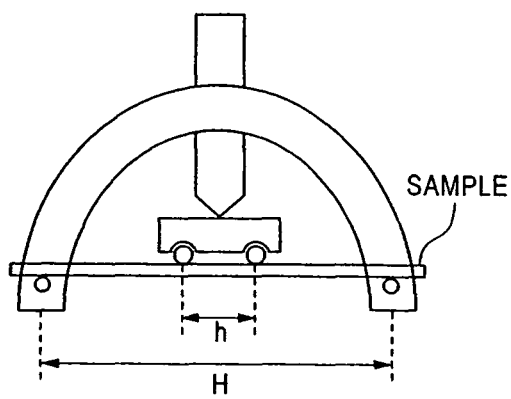
FIG. 2 is a drawing schematically illustrating a stress loading method in a four-point bending test.

(wherein E represents the modulus of longitudinal elasticity ($2.06 \times 10^5$ MPa); t, the thickness (mm) of the specimen; H, the distance (mm) between both end fulcrums; A=(H−h)/2 wherein h is the distance (mm) between intermediate fulcrums; and δ, a displacement (mm) at the center of the specimen). FIG. 2 shows a stress loading method in the four-point bending test.

Also, a 2 mm V-notch impact specimen of a ¼ size (thickness: 2.5 mm) was obtained from the formed and quenched member and measured by a Charpy impact test to determine the fracture appearance transition temperature vTrs and evaluate the low temperature toughness.

Furthermore, a specimen of 30 mm in width and 90 mm in length was cut out from the formed and quenched member and measured by a completely reversed plane bending fatigue test to evaluate fatigue endurance. In the completely reversed plane bending fatigue test, the maximum stress amplitude σf causing no fatigue failure was determined as fatigue endurance with a stress ratio of −1.0 under completely reversed plane bending, a repetition rate of 25 Hz, and a maximum number of cycles of $10^7$ cycles.

Total x of multiplying factors including that for B according to Grossmann: 1.2 to less than 1.7

The multiplying factors according to Grossmann are material parameters required to be controlled for achieving the desired formability of an original sheet, hardness after quenching, and fatigue endurance. As the multiplying factors according to Grossmann, for example, the values for the respective elements described in Table 3 of Iron & Steel Material Science, Leslie, Maruzen, pp. 402-405 are used. In other words, the value of each element is determined according to the content thereof, and the total x of the elements is determined. As the multiplying factor for C among the multiplying factors according to Grossmann, the value for ASTM grain No. 7 is used. When dissolved B is contained in an amount larger than the N equivalent with consideration of fixing by TiN, the multiplying factor for B which has not been specified is considered as 0.2 regardless of the content.

Figure 3:
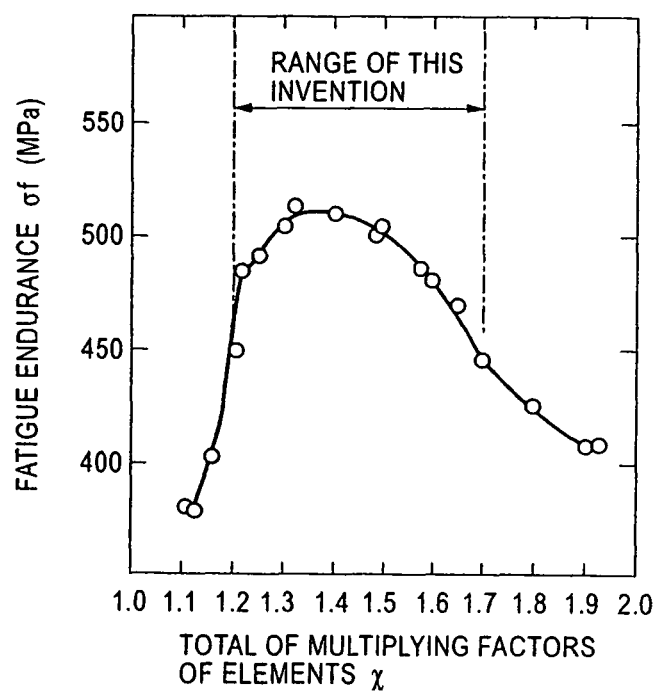
FIG. 3 is a graph showing the influence of the total x of multiplying factors for elements on the fatigue endurance of in a completely reversed plane bending fatigue test.

When the total x is less than 1.2, hardness after quenching decreases, and it is thus impossible to obtain the excellent fatigue endurance after quenching, e.g., a maximum stress amplitude σf of 450 MPa or more without fatigue failure in the completely reversed plane bending fatigue test. On the other hand, when the total x is 1.7 or more, the ferrite volume fraction of steel is less than 30%, the formability of an original sheet decreases, and a portion where the thickness is locally decreased becomes a stress concentration portion, thereby failing to achieve excellent fatigue endurance, e.g., an σf of 450 MPa or more after quenching. Therefore, the total x of multiplying factors including that for B according to Grossmann is limited to 1.2 to less than 1.7. FIG. 3 shows the relation between the total x of multiplying factors for the elements and the fatigue endurance σf in the completely reversed plane bending fatigue test.

The balance other than the above-descried components is substantially composed of Fe.

The steel has a structure in which the ferrite grain diameter df corresponding to a circle is 1.1 μm to less than 12 μm, and the ferrite volume fraction Vf is 30% to less than 98%.

Ferrite grain diameter df corresponding to a circle: 1.1 μm to less than 12 μm

The microstructure of a raw material (steel) before quenching is an important material parameter for securing excellent formability, high fatigue endurance after quenching, and the like. When the ferrite grain diameter df corresponding to a circuit is less than 1.1 μm, desired formability cannot be secured, and a portion where the thickness is locally decreased becomes a stress concentration portion, thereby greatly decreasing fatigue endurance after quenching. On the other hand, when the df is 12 μm or more, particularly the hardenability of a raw material surface decreases, and thus fatigue endurance greatly decreases. Therefore, the ferrite grain diameter df corresponding to a circle of the steel is about 1.1 μm to less than about 12 μm.

Figure 4:
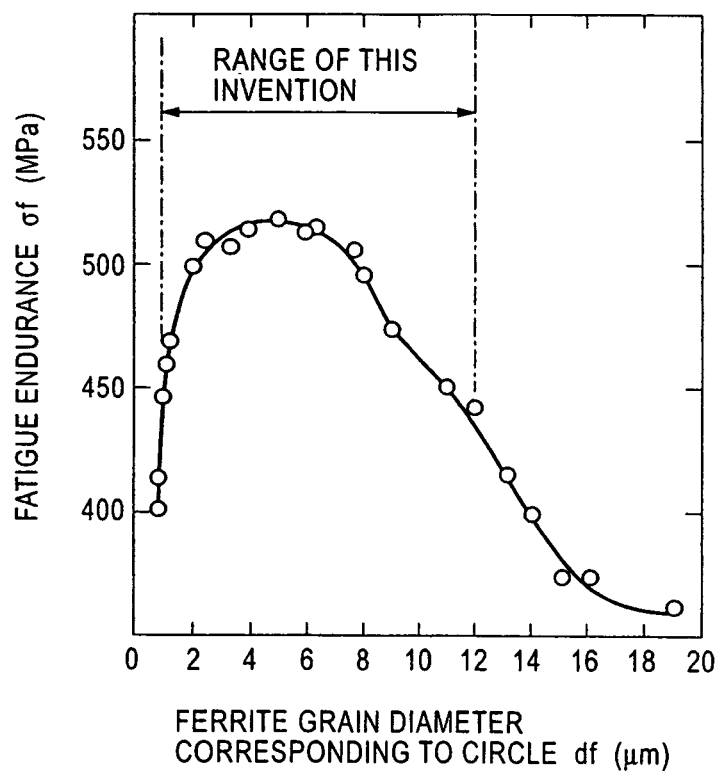
FIG. 4 is a graph showing the influence of the ferrite grain diameter df corresponding to a circle of a structure before quenching on the fatigue endurance of after quenching.

FIG. 4 shows the relation between the ferrite grain diameter df corresponding to a circuit of a raw material (steel) structure before quenching and the fatigue endurance σf in the completely reversed plane bending fatigue test after quenching. The figure indicates that when the ferrite grain diameter df corresponding to a circuit of a raw material (steel) structure before quenching is 1.1 μm to less than 12 μm, high fatigue endurance, e.g., an σf of 450 MPa or more, is obtained. In particular, when df is in a range of 2.0 to 7.9 μm, a high fatigue endurance of 500 MPa or more is obtained. The term "ferrite" includes Polygonal ferrite, Acicular ferrite, Widmannstaetten ferrite, and Bainitic ferrite.

The ferrite grain diameter df corresponding to a circle is determined by a method in which the area of each ferrite grain is measured by processing an image of the structure, the area of each ferrite grain is converted to a diameter corresponding to a circle, and the obtained ferrite grain diameters corresponding to a circle are averaged. Like the steel used in the present invention, a material having hardenability contains ferrite grains having no regular form. Therefore, the used ferrite gain diameter is the diameter corresponding to a circuit determined by image processing, not the diameter determined by a cutting method.

A second phase other than the ferrite phase preferably includes carbide, pearlite, bentonite, martensite, or a mixture thereof. Like in the ferrite, in the second phase, the average grain diameter ds corresponding to a circle is preferably 1.1 μm to less than 12 μm.

Ferrite volume fraction Vf: 30% to less than 98%

When the volume fraction Vf of the raw material (steel) before quenching is less than 30%, desired formability cannot be secured, and a portion where the thickness is locally decreased becomes a stress concentration portion, thereby greatly decreasing fatigue endurance after quenching. On the other hand, within the above-described component ranges, it is difficult to secure a ferrite volume fraction of 98% or more. Therefore, this value is the upper limit. The ferrite volume fraction is determined by a method in which a section is etched with nital and then observed in at least two fields of view and imaged by a scanning electron microscope (SEM) with a magnification of ×1000, grain boundaries and the second phase are separated, and the ferrite volume fraction is determined by image processing.

Next, a method for producing a hot-rolled steel strip will be described.

First, preferably, molten steel having the above-described composition is refined by a usual refining method such as a converter or the like and then formed in a steel slab by a usual casting method such as continuous casting or the like. Next, the steel slab having the above composition is heated and hot-rolled to form a hot-rolled steel strip.

Next, the preferred hot rolling conditions for the steel slab will be described.

Slab heating temperature: 1160° C. to 1320° C.

Elements which form slightly soluble carbonitrides, such as Nb, Ti, and the like, are used as essential elements. Therefore, when the slab heating temperature is lower than 1160° C., re-dissolution of carbonitrides becomes locally insufficient, and the ferrite grain diameter after hot rolling partially exceeds 12 μm, thereby decreasing workability before quenching. On the other hand, when the slab heating temperature exceeds 1320° C., the surface quality of final products, such as steel tubes and steel strips, degrades. Therefore, the slab heating temperature is preferably about 1160° C. to about 1320° C. and more preferably about 1180° C. to about 1280° C.

Finisher delivery temperature: 750° C. to 980° C.

The finisher delivery temperature of hot rolling is an important production parameter which determines the ferrite grain diameter after hot rolling. When the finisher delivery temperature is lower than 750° C., rolling in the ferrite region is caused, and rolling strain remains after coiling to decrease formability before quenching. On the other hand, when the finisher deliver temperature exceeds 980° C., the ferrite grains coarsen, thereby decreasing formability before quenching. Therefore, the finisher delivery temperature is preferably about 750° C. to about 980° C. and more preferably about 820° C. to about 940° C.

Slow cooling time before coiling: 2 seconds or more

After finish rolling of hot rolling is finished, the steel strip is not immediately coiled, but a slow cooling time of 2 seconds or more is preferably secured before coiling. The slow cooling after the end of finish rolling means cooling at a cooling rate of 20° C./s or less. Consequently, ferrite transformation can be sufficiently performed to improve formability before quenching. Coiling temperature: 560° C. to 740° C.

The coiling temperature after the finish of hot rolling is an important production parameter which determines the ferrite volume fraction after hot rolling. When the coiling temperature is lower than 560° C., the desired ferrite volume fraction cannot be obtained, and thus formability before quenching decreases. The higher the coiling temperature within the specified range, the more the formability before quenching is improved. However, when the coiling temperature exceeds 740° C., the C amount in a surface layer significantly decreases, and thus fatigue endurance after quenching degrades. Therefore, the coiling temperature is preferably about 560° C. to about 740° C. and more preferably about 600° C. to about 700° C.

Even with a steel slab in which it is difficult to produce a desired ferrite structure because of high hardenability, therefore, the above-described production method produces a hot-rolled steel strip having a desired microstructure most suitable for formability before quenching and fatigue endurance after quenching, e.g., an average ferrite gain diameter corresponding to a circle of 1.1 μm to 12 μm and a ferrite volume fraction of 30% to 98%. As a result, it is possible to produce a hot-rolled steel strip for structural parts of automobiles having excellent formability, fatigue endurance after quenching, low temperature toughness, and resistance for hydrogen embrittlement.

By using the hot-rolled steel strip produced by the above-described method, a steel tube for structural parts of automobiles having excellent formability, fatigue endurance after quenching, low temperature toughness, and resistance for hydrogen embrittlement can be produced by electric resistance welded tube making under proper conditions.

Next, preferred conditions for producing steel tubes will be described.

The hot-rolled steel strip produced under the above-descried conditions is used as a raw material. The raw material may be used immediately after hot rolling or after descaling by pickling. The raw material immediately after hot rolling or after pickling is preferably formed in a steel tube by electric resistance welded tube making with a width reduction of hoop of 8% or less.

Conditions for electric resistance welded tube making: width reduction of hoop of 8% or less When the steel strip is formed in a steel tube by continuous roll forming and electric resistance welded tube making, the width reduction of hoop is an important production parameter for securing desired formability before quenching. When the width reduction of hoop exceeds 8%, formability significantly decreases with tube making, and thus necessary formability before quenching cannot be obtained. Therefore, the width reduction of hoop is preferably about 8% or less (including 0%). The width reduction of hoop is defined by the following equation:

Width reduction of hoop(%)=[(width of untreated steel strip)−π{(outer diameter of product−wall thickness of product)}]/[π{(outer diameter of product)−(wall thickness of product)}]×100

In the method for producing the steel tube, the raw material is not limited to the hot-rolled steel strip. Of course, a cold-rolled annealed steel strip produced by cold-rolling and annealing the hot-rolled steel strip produced by the above-described method for producing the hot-rolled steel strip, or a surface-treated steel strip further subjected to various surface treatments may be used. Instead of the electric resistance welded tube making, roll forming, press-section closing of a cut plate, or a tube making process combined with cold-, warm-, or hot-reduction, heat treatment, and the like may be used. Furthermore, instead of electric resistance welding, laser welding, arc welding, plasma welding, or the like may be used.

EXAMPLES

Example 1

Each of the 26 types of steel slabs A to Z shown in Table 1 was re-heated to the slab heating temperature shown in Table 3 and then hot-rolled under the conditions shown in Table 3 to form a hot-rolled steel strip of 2.6 mm in thickness. The resulting hot-rolled steel strip was pickled, slitted, and then subjected to electric resistance welded tube making by roll forming and electric resistance welding to form a welded steel tube having an outer diameter of 101.6 mm. The width reduction of hoop in tube making was as shown in Table 3. Table 2 shows the multiplying factors for elements in each steel and the total thereof.

Furthermore, a specimen for structure observation was obtained from each hot-rolled steel strip, polished, corroded, observed with SEM (×1000), and imaged to measure the ferrite volume fraction, the average ferrite grain diameter corresponding to a circle, and the second phase grain diameter corresponding to a circle by image processing. The grain diameter corresponding to a circle was determined by a method in which the area of each grain was measured, the diameter of a circle corresponding to the area was determined as the diameter corresponding to a circle, and the diameters of the grains were averaged.

The resulting steel tube was formed in an axle beam with a closed section and then quenched by heating at about 920° C. in a continuous furnace with a controlled atmosphere and then water cooling. After the quenching, a cross-section hardness test, a completely reversed plane bending fatigue test, a Charpy impact test, a four-point bending test, and a completely reversed plane bending fatigue test after a corrosion test were carried out. The test methods were as follows:

(1) Cross-Section Hardness Test

A specimen was cut out from a formed and quenched member, and the Vickers hardness (load: 10 kgf) was measured over the entire region in the thickness direction. The measured values were averaged to determine the cross-section hardness of the member after quenching.

(2) Completely Reversed Plane Bending Fatigue Test

In the completely reversed plane bending fatigue test, a specimen of 30 mm in width and 90 mm in length was cut out from a formed and quenched member and tested at a stress ratio of −1.0 under completely reversed plane bending, a repetition rate of 25 Hz, and a maximum number of cycles of $10^7$ cycles to determine the maximum stress amplitude σf as fatigue endurance and evaluate fatigue endurance after quenching.

(3) Charpy Impact Test

In the Charpy impact test, a 2 mm V-notch impact specimen of ¼ size (thickness: 2.5 mm) was obtained from a formed and quenched member and tested to determine the fracture appearance transition temperature vTrs and evaluate low temperature toughness.

(4) Four-Point Bending Test

In the four-point bending test, a specimen of 5 mm in width and 80 mm in length was cut out from a formed and quenched member and immersed in 0.1N hydrochloric acid to determine the failure time by the test with a load stress σ of 1180 MPa for a time of 200 hours at a maximum as shown in FIG. 2, for evaluating resistance for hydrogen embrittlement. The load stress was calculated according to the following equation:

$$\sigma(MPa) = (12Et\delta)/(3H^2 - 4A^2)$$

(wherein E represents the modulus of longitudinal elasticity ($2.06 \times 10^5$ MPa); t, the thickness (mm) of the specimen; H, the distance (mm) between both end fulcrums; A=(H−h)/2 wherein h is the distance (mm) between intermediate fulcrums; and δ, an amount of displacement (mm) at the center of the specimen).

(5) Completely Reversed Plane Bending Fatigue Test after Corrosion Test

In the completely reversed plane bending fatigue test after a corrosion test, a specimen of 30 mm in width and 90 mm in length was cut out from a formed and quenched member and subjected to a salt spray test for 20 days according to the prescriptions of JIS Z2371. Then, the completely reversed plane bending fatigue test (stress ratio: −1, repetition rate: 25 Hz) was carried out with stress amplitude σf to determine the fatigue life. When the fatigue life was ½ or more of the number of cycles of an uncorroded specimen, it was evaluated as ○, and other cases were evaluated as x.

Each of the steel tubes before quenching was subjected to a tensile test of the untreated tube using a tensile specimen of JIS No. 12 to determine elongation El and evaluate formability. The results are shown in Table 4.

In all examples, the elongation El of the untreated tube is 20% or more (JIS No. 12 specimen), the cross-section hardness HV(10) after quenching is 350 to 550, the completely reversed plane bending fatigue endurance σf is 500 MPa or more, the fracture appearance transition temperature vTrs in the Charpy impact test is −40° C. or less, the four-point bending failure time in 0.1N hydrochloric acid is 200 hours or more, and the fatigue life in the corrosion fatigue test is ½ or more of the number of cycles of the uncorroded specimen. Therefore, excellent formability, fatigue endurance, low temperature toughness, resistance for hydrogen embrittlement, and corrosion fatigue endurance are exhibited.

On the other hand, in Comparative Example Nos. 5 to 26 in which any one of the steel composition, the carbon equivalent Ceq, and the total x of multiplying factors is out of the desired range, any one of the formability, fatigue endurance, low temperature toughness, resistance for hydrogen embrittlement, and corrosion fatigue endurance decreases. In Comparative Example Nos. 5, 9, and 14 in which the contents of C, Mn, and B, respectively, in the steel composition are lower than the desired ranges, the cross-section hardness Hv after quenching is less than 350, and σf after quenching is as low as less than 450 MPa. In Comparative Example Nos. 6, 10, and 15 in which the contents of C, Mn, and B, respectively, in the steel composition exceed the desired ranges, the four-point bending failure time in 0.1N hydrochloric acid is less than 200 hours, and thus the resistance for hydrogen embrittlement degrades. In Comparative Example No. 7 in which the Si content is lower than the desired range, the ferrite volume fraction is as low as less than 30%, and the elongation El of the untreated tube is as low as less than 20%. On the other hand, in Comparative Example No. 8 in which the Si content exceeds the desired range, vTrs is −40° C. or higher, and thus low temperature toughness degrades. In Comparative Example Nos. 11, 12, and 13 in which the contents of P, and S, and O, respectively, exceed the desired ranges, resistance for hydrogen embrittlement, fatigue endurance, or untreated tube El is low.

In Comparative Example Nos. 16, 17, 18, 19, 20, and 21 in which the contents of Nb, Ti, Cr, Mo, Ni, and V, respectively, exceed the desired ranges, the untreated tube El is as low as less than 20%, and thus formability degrades. In Comparative Example No. 22 in which the Ca content exceeds the desired range, El, fatigue endurance, low temperature toughness, and resistance for hydrogen embrittlement are low. In Comparative Example Nos. 23 and 25 in which the carbon equivalent Ceq or the total x of multiplying factors exceeds the desired range, the untreated tube El is low, the hardness HV(10) after quenching is as high as over 550, vTrs is high, and resistance for hydrogen embrittlement decreases. In Comparative Example Nos. 24 and 26 in which Ceq or x is lower than the desired range, the ferrite grain diameter corresponding to a circle is as large as 12 μm or more, the hardness HV(10) after quenching is as low as less than 350, and the completely reversed plane bending fatigue endurance σf after quenching is as low as less than 450 MPa.

Example 2

A hot-rolled steel strip was produced using a steel slab having each of the compositions of steels A to D shown in Table 1 under the hot rolling conditions shown in Table 5. The hot-rolled steel strip was descaled by pickling and then formed in an electric resistance welded tube under the tube making conditions shown in Table 5. Some of the hot-rolled steel strips were used immediately after hot rolling (with scale). Also, some of the hot-rolled steel strips were formed in tubes after cold rolling and annealing, and Zn or Al surface treatment. For some of the hot-rolled steel strips, press welding or roll forming-welding was used instead of electric resistance welded tube making. Also, some of the steel tubes were plated with Zn after tube making. Furthermore, some of the steel tubes were subjected to warm- or hot-reduction.

Each of the steel tubes used as tubular materials was formed in an axle beam (or formed in a suspension arm in No. 41) and then heated to about 920° C. in a continuous furnace with a controlled atmosphere, followed by water cooling. Some of the members were subjected to shot blasting or shot peening after quenching.

For the resulting members after quenching, the cross-section hardness test, the completely reversed plane bending test, the Charpy impact test, the four-point bending test in 0.1N hydrochloric acid, and the completely reversed plane bending fatigue test after the salt water spray test for 20 days (JIS Z2371) were conducted. The test methods were the same as in EXAMPLE 1. The results are shown in Table 6.

In all examples, the elongation El of the untreated tube is 20% or more (JIS No. 12 specimen), the cross-section hardness HV(10) after quenching is 350 to 550, the completely reversed plane bending fatigue endurance σf is 500 MPa or more, the fracture appearance transition temperature vTrs in the Charpy impact test is −40° C. or less, the four-point bending failure time in 0.1N hydrochloric acid is 200 hours or more, and the decreased fatigue life in the corrosion fatigue test is ½ or more of the number of cycles of an uncorroded specimen. Therefore, excellent formability, fatigue endurance, low temperature toughness, resistance for hydrogen embrittlement, and corrosion fatigue endurance are exhibited.

In Example No. 28 in which the slab heating temperature is lower than the preferred range, Example No. 30 in which the finisher delivery temperature is higher than the preferred range, Example No. 31 in which the finisher deliver temperature is lower than the preferred range, Example No. 33 in which the slow cooling time on a run out table of hot rolling is shorter than the preferred range, and Example No. 35 in which the coiling temperature is lower than the preferred range, the ferrite grain diameter df is larger than 12 µm or the ferrite volume fraction Vf is less than 30%, the elongation of the untreated tube is as low as less than 20% to decrease formability, and the completely reversed plane bending fatigue endurance σf after quenching is as low as less than 450 MPa except in Example No. 33. In Example No. 36 in which the hot-rolled strip coiling temperature is higher than the preferred range, the elongation El of the untreated tube is as high as 20% or more, but σf is low due to surface decarbonization. In Example No. 38 in which the width reduction of hoop in tube making is higher than the preferred range and the coiling temperature is lower than the preferred range, the elongation El of the untreated tube is as low as 15%, and σf is also low.

In Example No. 40, pickling after hot rolling was omitted; in Example No. 41, the suspension arm of Ø60.5×2.6 t was formed and then quenched; in Example No. 42, the steel strip subjected to cold rolling and annealing after hot rolling was formed in an electric resistance welded tube; in Example No. 43, the steel strip was press-formed and then welded (arc, laser, or plasma) to a closed section; in Example No. 44, the steel strip was roll-formed to a closed section and then welded; in Example Nos. 45 and 46, the black plate subjected to Zn or Al plating after quenching was formed in an electric resistance welded tube; in Example No. 47, the electric resistance welded tube was plated with Zn and then quenched; in Examples Nos. 48 and 49, the electric resistance welded tube was subjected to hot- or warm-reduction; in Example No. 50, the untreated tube was heated and quenched during forming; in Example No. 51, shot blasting was performed after quenching; and in Example No. 52, shot peening was performed after quenching. In all Example Nos. 40 to 52 which are desired examples, the elongation El of the untreated tube is 20% or more (JIS No. 12 specimen), the cross-section hardness HV(10) after quenching is 350 to 550, the completely reversed plane bending fatigue endurance σf is 500 MPa or more, the fracture appearance transition temperature vTrs in the Charpy impact test is −40° C. or less, the four-point bending failure time in 0.1N hydrochloric acid is 200 hours or more, and a decrease in the fatigue life in the corrosion fatigue test is less than ½ of the number of cycles of an uncorroded specimen. Therefore, excellent formability, fatigue endurance, low temperature toughness, resistance for hydrogen embrittlement, and corrosion fatigue endurance are exhibited.

INDUSTRIAL APPLICABILITY

It is possible to easily produce a steel for structural parts of automobiles at low cost, the steel having excellent formability, excellent fatigue endurance after quenching, excellent low temperature toughness, excellent resistance for hydrogen embrittlement, and excellent corrosion fatigue endurance which are required for suspension and chassis members.

TABLE 1

| Steel | Chemical components (% by mass) | | | | | | | | | |
|---|---|---|---|---|---|---|---|---|---|---|
| | C | Si | Mn | P | S | Sol.Al | N | O | B | Nb |
| A | 0.21 | 0.15 | 1.44 | 0.011 | 0.0024 | 0.035 | 0.0032 | 0.0017 | 0.0001 | 0.006 |
| B | 0.23 | 0.18 | 1.28 | 0.014 | 0.0021 | 0.043 | 0.0017 | 0.0016 | 0.0015 | 0.002 |
| C | 0.18 | 0.41 | 1.80 | 0.013 | 0.0013 | 0.055 | 0.0042 | 0.0008 | 0.0013 | 0.014 |
| D | 0.20 | 0.20 | 1.31 | 0.010 | 0.0009 | 0.030 | 0.0035 | 0.0012 | 0.0011 | 0.015 |
| E | <u>0.16</u> | 0.22 | 1.26 | 0.008 | 0.0005 | 0.021 | 0.0024 | 0.0012 | 0.0008 | 0.016 |
| F | <u>0.32</u> | 0.08 | 0.92 | 0.002 | 0.0023 | 0.016 | 0.0037 | 0.0023 | 0.0013 | 0.011 |
| G | 0.19 | <u>0.03</u> | 1.52 | 0.004 | 0.0016 | 0.072 | 0.0015 | 0.0016 | 0.0009 | 0.008 |
| H | 0.22 | <u>1.23</u> | 1.13 | 0.016 | 0.0017 | 0.037 | 0.0037 | 0.0011 | 0.0016 | 0.009 |
| I | 0.27 | 0.32 | <u>0.84</u> | 0.014 | 0.0011 | 0.053 | 0.0046 | 0.0009 | 0.0014 | 0.001 |
| J | 0.22 | 0.25 | <u>1.94</u> | 0.018 | 0.0019 | 0.067 | 0.0042 | 0.0013 | 0.0012 | 0.022 |

TABLE 1-continued

| | | | | | | | | | | |
|---|---|---|---|---|---|---|---|---|---|---|
| K | 0.21 | 0.17 | 1.34 | 0.023 | 0.0009 | 0.035 | 0.0031 | 0.0015 | 0.0019 | 0.009 |
| L | 0.19 | 0.18 | 1.20 | 0.015 | 0.0045 | 0.022 | 0.0029 | 0.0013 | 0.0016 | 0.011 |
| M | 0.21 | 0.26 | 1.08 | 0.014 | 0.0011 | 0.036 | 0.0026 | 0.0056 | 0.0023 | 0.016 |
| N | 0.18 | 0.14 | 1.16 | 0.017 | 0.0078 | 0.029 | 0.0040 | 0.0070 | 0.0000 | 0.015 |
| O | 0.25 | 0.35 | 0.97 | 0.014 | 0.0006 | 0.074 | 0.0019 | 0.0015 | 0.0032 | 0.019 |
| P | 0.26 | 0.26 | 1.36 | 0.013 | 0.0003 | 0.051 | 0.0033 | 0.0011 | 0.0015 | 0.032 |
| Q | 0.21 | 0.40 | 1.55 | 0.015 | 0.0012 | 0.020 | 0.0040 | 0.0021 | 0.0018 | 0.027 |
| R | 0.22 | 0.24 | 1.16 | 0.013 | 0.0008 | 0.057 | 0.0046 | 0.0006 | 0.0011 | 0.016 |
| S | 0.26 | 0.09 | 1.34 | 0.011 | 0.0014 | 0.044 | 0.0047 | 0.0011 | 0.0010 | 0.015 |
| T | 0.20 | 0.10 | 1.24 | 0.012 | 0.0021 | 0.025 | 0.0019 | 0.0015 | 0.0009 | 0.006 |
| U | 0.20 | 0.24 | 1.37 | 0.011 | 0.0009 | 0.067 | 0.0037 | 0.0015 | 0.0011 | 0.015 |
| V | 0.23 | 0.37 | 1.33 | 0.008 | 0.0018 | 0.035 | 0.0032 | 0.0013 | 0.0024 | 0.014 |
| W | 0.23 | 0.40 | 1.60 | 0.018 | 0.0026 | 0.045 | 0.0023 | 0.0016 | 0.0017 | 0.012 |
| X | 0.18 | 0.07 | 1.25 | 0.012 | 0.0015 | 0.018 | 0.0017 | 0.0015 | 0.0005 | 0.011 |
| Y | 0.28 | 0.40 | 1.78 | 0.013 | 0.0008 | 0.033 | 0.0016 | 0.0015 | 0.0012 | 0.008 |
| Z | 0.19 | 0.12 | 1.10 | 0.010 | 0.0010 | 0.038 | 0.0032 | 0.0012 | 0.0011 | 0.013 |

| | Chemical components (% by mass) | | | | | | | Carbon equivalent |
|---|---|---|---|---|---|---|---|---|
| Steel | Ti | Cr | Mo | Cu | Ni | V | Ca | Ceq |
| A | 0.023 | 0.137 | 0.168 | 0.030 | 0.034 | 0.015 | 0.0003 | 0.528 |
| B | 0.004 | 0.081 | 0.022 | 0.142 | — | — | 0.0022 | 0.473 |
| C | 0.025 | 0.032 | 0.132 | — | — | — | — | 0.536 |
| D | 0.013 | 0.149 | 0.102 | — | — | — | — | 0.482 |
| E | 0.018 | 0.186 | 0.078 | 0.084 | — | — | 0.0006 | 0.436 |
| F | 0.022 | 0.012 | 0.074 | — | — | — | — | 0.498 |
| G | 0.015 | 0.008 | 0.032 | — | — | 0.012 | — | 0.454 |
| H | 0.013 | 0.168 | 0.108 | — | — | — | — | 0.520 |
| I | 0.013 | 0.132 | 0.163 | — | — | — | — | 0.490 |
| J | 0.012 | 0.154 | 0.167 | — | 0.055 | — | — | 0.627 |
| K | 0.018 | 0.067 | 0.122 | 0.120 | — | — | — | 0.484 |
| L | 0.007 | 0.069 | 0.156 | — | — | — | 0.0011 | 0.450 |
| M | 0.004 | 0.089 | 0.132 | — | — | — | — | 0.452 |
| N | 0.013 | 0.182 | 0.176 | 0.078 | — | — | — | 0.460 |
| O | 0.015 | 0.122 | 0.155 | — | — | 0.023 | — | 0.491 |
| P | 0.005 | 0.156 | 0.186 | — | — | — | — | 0.575 |
| Q | 0.044 | 0.081 | 0.176 | — | — | — | 0.0014 | 0.545 |
| R | 0.022 | 0.254 | 0.143 | — | 0.176 | — | — | 0.514 |
| S | 0.029 | 0.116 | 0.275 | — | — | — | — | 0.579 |
| T | 0.014 | 0.181 | 0.122 | — | 0.167 | — | — | 0.482 |
| U | 0.002 | 0.116 | 0.182 | — | — | 0.035 | — | 0.510 |
| V | 0.021 | 0.156 | 0.146 | — | — | — | 0.0045 | 0.535 |
| W | 0.011 | 0.120 | 0.160 | — | — | 0.020 | — | 0.579 |
| X | 0.021 | 0.040 | 0.016 | — | — | — | — | 0.403 |
| Y | 0.014 | 0.002 | 0.122 | — | 0.156 | — | — | 0.628 |
| Z | 0.008 | 0.040 | 0.023 | — | — | 0.020 | — | 0.393 |

TABLE 2

| | Multiplying factor for each element | | | | | | | | | | | | | | | | Total of multi-plying factors χ |
|---|---|---|---|---|---|---|---|---|---|---|---|---|---|---|---|---|---|
| Steel | C | Si | Mn | P | S | Sol.Al | N | O | B | Nb | Ti | Cr | Mo | Cu | Ni | V | Ca | |
| A | 0.188 | 0.043 | 0.794 | 0.011 | — | 0.017 | — | — | 0.200 | — | −0.018 | 0.108 | 0.170 | — | 0.005 | 0.061 | — | 1.579 |
| B | 0.208 | 0.052 | 0.733 | 0.011 | — | 0.022 | — | — | 0.200 | — | — | 0.069 | 0.025 | — | — | — | — | 1.320 |
| C | 0.158 | 0.110 | 0.908 | 0.011 | — | 0.028 | — | — | 0.200 | — | −0.018 | 0.027 | 0.143 | — | — | — | — | 1.567 |
| D | 0.179 | 0.057 | 0.741 | 0.011 | — | 0.017 | — | — | 0.200 | — | −0.008 | 0.115 | 0.114 | — | — | — | — | 1.426 |
| E | 0.133 | 0.062 | 0.725 | — | — | 0.012 | — | — | 0.200 | — | −0.008 | 0.143 | 0.083 | — | — | — | — | 1.350 |
| F | 0.281 | 0.024 | 0.609 | — | — | 0.006 | — | — | 0.200 | — | −0.018 | 0.009 | 0.083 | — | — | — | — | 1.194 |
| G | 0.169 | 0.009 | 0.822 | — | — | 0.039 | — | — | 0.200 | — | −0.008 | — | 0.037 | — | — | 0.061 | — | 1.329 |
| H | 0.198 | 0.268 | 0.675 | 0.011 | — | — | — | — | 0.200 | — | −0.008 | 0.129 | 0.114 | — | — | — | — | 1.604 |
| I | 0.241 | 0.088 | 0.580 | 0.011 | — | 0.028 | — | — | 0.200 | — | −0.008 | 0.108 | 0.170 | — | — | — | — | 1.418 |
| J | 0.198 | 0.070 | 0.946 | 0.011 | — | 0.033 | — | — | 0.200 | — | −0.008 | 0.122 | 0.170 | — | 0.008 | — | — | 1.750 |
| K | 0.188 | 0.049 | 0.757 | 0.022 | — | 0.017 | — | — | 0.200 | — | −0.008 | 0.053 | 0.134 | — | — | — | — | 1.412 |
| L | 0.169 | 0.052 | 0.702 | 0.011 | — | 0.012 | — | — | 0.200 | — | — | 0.053 | 0.161 | — | — | — | — | 1.360 |
| M | 0.188 | 0.073 | 0.662 | 0.011 | — | 0.017 | — | — | 0.200 | — | — | 0.069 | 0.143 | — | — | — | — | 1.363 |
| N | 0.158 | 0.041 | 0.687 | 0.011 | — | 0.012 | — | — | — | — | −0.008 | 0.143 | 0.179 | — | — | — | — | 1.223 |
| O | 0.225 | 0.095 | 0.627 | 0.011 | — | 0.039 | — | — | 0.200 | — | −0.008 | 0.101 | 0.161 | — | — | 0.097 | — | 1.548 |
| P | 0.233 | 0.073 | 0.765 | 0.011 | — | 0.028 | — | — | 0.200 | — | — | 0.122 | 0.188 | — | — | — | — | 1.620 |
| Q | 0.188 | 0.107 | 0.828 | 0.011 | — | 0.012 | — | — | 0.200 | — | −0.034 | 0.069 | 0.179 | — | — | — | — | 1.560 |
| R | 0.198 | 0.067 | 0.687 | 0.011 | — | 0.028 | — | — | 0.200 | — | −0.018 | 0.187 | 0.152 | — | 0.026 | — | — | 1.538 |
| S | 0.233 | 0.027 | 0.757 | 0.011 | — | 0.022 | — | — | 0.200 | — | −0.018 | 0.093 | 0.258 | — | — | — | — | 1.583 |
| T | 0.179 | 0.029 | 0.718 | 0.011 | — | 0.012 | — | — | 0.200 | — | −0.008 | 0.143 | 0.134 | — | 0.024 | — | — | 1.442 |

TABLE 2-continued

| | | | | | | Multiplying factor for each element | | | | | | | | | | | Total of multi-plying |
|---|---|---|---|---|---|---|---|---|---|---|---|---|---|---|---|---|---|
| Steel | C | Si | Mn | P | S | Sol.Al | N | O | B | Nb | Ti | Cr | Mo | Cu | Ni | V | Ca | factors χ |
| U | 0.179 | 0.067 | 0.765 | 0.011 | — | 0.017 | — | — | 0.200 | — | — | 0.093 | 0.188 | — | — | 0.137 | — | 1.657 |
| V | 0.208 | 0.100 | 0.749 | — | — | 0.017 | — | — | 0.200 | — | −0.018 | 0.122 | 0.152 | — | — | — | — | 1.530 |
| W | 0.208 | 0.107 | 0.846 | 0.011 | — | 0.022 | — | — | 0.200 | — | −0.008 | 0.101 | 0.170 | — | — | 0.097 | — | 1.754 |
| X | 0.158 | 0.021 | 0.718 | 0.011 | — | 0.006 | — | — | 0.200 | — | −0.0018 | 0.036 | 0.013 | — | — | — | — | 1.145 |
| Y | 0.250 | 0.107 | 0.902 | 0.011 | — | 0.017 | — | — | 0.200 | — | −0.008 | — | 0.134 | — | 0.023 | — | — | 1.636 |
| Z | 0.169 | 0.035 | 0.669 | 0.011 | — | 0.017 | — | — | 0.200 | — | — | 0.036 | 0.025 | — | — | 0.097 | — | 1.259 |

TABLE 3

| | | Hot rolling conditions | | | | Tube making Width |
|---|---|---|---|---|---|---|
| No. | Steel | Slab heating temperature (° C.) | Finisher temperature (° C.) | Slow cooling time (s) | Coiling temperature (° C.) | reduction of hoop (%) |
| 1-25 | A-Z | About 1240 | About 910 | About 4 | About 660 | About 3 |

TABLE 4

| No. | Steel | Ferrite gain diameter corre-sponding to circle, df (μm) | Second phase diameter corre-sponding to circle, ds (μm) | Ferrite volume fraction, Vf (%) | Elongation of untreated tube El (%) | Cross-section hardness after quenching HV (10) | Completely reversed plane bending fatigue endurance, of (MPa) | Fracture appearance transition temperature in Charpy impact test vTrs (° C.) | Four-point bending failure in 0.1N hydrochloric acid (h) | Corrosion fatigue endurance* | |
|---|---|---|---|---|---|---|---|---|---|---|---|
| 1 | A | 3.4 | 2.7 | 68 | 24 | 435 | 514 | −90 | >200 | ○ | This invention |
| 2 | B | 7.8 | 5.4 | 35 | 22 | 462 | 524 | −80 | >200 | ○ | This invention |
| 3 | C | 1.2 | 1.1 | 93 | 27 | 412 | 508 | −100 | >200 | ○ | This invention |
| 4 | D | 5.9 | 5.7 | 8 | 25 | 435 | 520 | −90 | >200 | ○ | This invention |
| 5 | E | 15.6 | 5.6 | 94 | 23 | 332 | 420 | −80 | >200 | ○ | Comp. Example |
| 6 | F | 8.2 | 5.1 | 77 | 24 | 562 | 488 | −75 | 48 | X | Comp. Example |
| 7 | G | 6.2 | 13.6 | 28 | 16 | 441 | 469 | −90 | >200 | ○ | Comp. Example |
| 8 | H | 5.9 | 5.1 | 68 | 24 | 426 | 478 | −30 | >200 | ○ | Comp. Example |
| 9 | I | 13.4 | 14.2 | 84 | 25 | 328 | 365 | −60 | >200 | ○ | Comp. Example |
| 10 | J | 7.2 | 5.4 | 56 | 24 | 436 | 467 | −70 | 72 | X | Comp. Example |
| 11 | K | 7.9 | 3.2 | 78 | 26 | 442 | 495 | −75 | 192 | X | Comp. Example |
| 12 | L | 7.6 | 1.8 | 85 | 19 | 415 | 435 | −35 | 192 | X | Comp. Example |
| 13 | M | 7.2 | 2.4 | 65 | 19 | 433 | 440 | −80 | >200 | ○ | Comp. Example |
| 14 | N | 7.4 | 5.2 | 49 | 22 | 345 | 422 | −60 | >200 | ○ | Comp. Example |
| 15 | O | 5.6 | 4.2 | 85 | 23 | 456 | 475 | −75 | 168 | X | Comp. Example |
| 16 | P | 6.2 | 6.5 | 55 | 18 | 468 | 482 | −85 | >200 | ○ | Comp. Example |
| 17 | Q | 3.4 | 2.5 | 62 | 18 | 436 | 488 | −35 | >200 | ○ | Comp. Example |
| 18 | R | 4.2 | 4.1 | 52 | 16 | 444 | 469 | −90 | >200 | ○ | Comp. Example |
| 19 | S | 1.5 | 1.6 | 47 | 17 | 478 | 478 | −75 | >200 | ○ | Comp. Example |
| 20 | T | 6.0 | 5.1 | 65 | 18 | 415 | 469 | −60 | >200 | ○ | Comp. Example |

TABLE 4-continued

| No. | Steel | Ferrite gain diameter corresponding to circle, df (μm) | Second phase diameter corresponding to circle, ds (μm) | Ferrite volume fraction, Vf (%) | Elongation of untreated tube El (%) | Cross-section hardness after quenching HV (10) | Completely reversed plane bending fatigue endurance, of (MPa) | Fracture appearance transition temperature in Charpy impact test vTrs (° C.) | Four-point bending failure in 0.1N hydrochloric acid (h) | Corrosion fatigue endurance* | |
|---|---|---|---|---|---|---|---|---|---|---|---|
| 21 | U | 5.8 | 6.5 | 52 | <u>19</u> | 433 | 471 | −70 | >200 | ○ | Comp. Example |
| 22 | V | 3.6 | 2.5 | 85 | <u>19</u> | 465 | <u>440</u> | <u>−35</u> | 192 | X | Comp. Example |
| 23 | W | 4.3 | 5.2 | <u>25</u> | <u>16</u> | <u>551</u> | 495 | <u>−25</u> | <u>72</u> | X | Comp. Example |
| 24 | X | <u>12.9</u> | 6.5 | 88 | 26 | <u>337</u> | <u>388</u> | −80 | >200 | ○ | Comp. Example |
| 25 | Y | 6.8 | 3.7 | 57 | <u>19</u> | <u>557</u> | 477 | <u>−30</u> | <u>48</u> | X | Comp. Example |
| 26 | Z | <u>13.2</u> | 7.3 | 82 | 23 | <u>319</u> | <u>388</u> | −85 | >200 | ○ | Comp. Example |

In Table 4, in the column of corrosion fatigue endurance*, when the fatigue life in the completely reserved plane bending fatigue test with stress amplitude of after a salt spray test for 20 days was ½ or more of the number of cycles of an uncorroded specimen, the corrosion fatigue endurance was evaluated as ○, and other cases were evaluated as x.

TABLE 5

| | | Hot rolling conditons | | | | Tube making | |
|---|---|---|---|---|---|---|---|
| No. | Steel | Slab heating temperature (° C.) | Finisher temperature (° C.) | Slow cooling time (s) | Coiling temperature (° C.) | Width reduction of hoop (%) | Remarks |
| 27 | A | 1230 | 930 | 6.8 | 660 | 3.2 | |
| 28 | A | <u>1140</u> | 940 | 2.4 | 690 | 5.6 | |
| 29 | A | 1190 | 890 | 2.2 | 700 | 6.5 | |
| 30 | A | 1210 | <u>1020</u> | 3.5 | 710 | 2.4 | |
| 31 | A | 1190 | <u>730</u> | 4.7 | 610 | 3.5 | |
| 32 | B | 1230 | 900 | 3.8 | 630 | 1.8 | |
| 33 | B | 1250 | 910 | <u>1.4</u> | 625 | 1.4 | |
| 34 | B | 1180 | 920 | 6.4 | 670 | 0.9 | |
| 35 | B | 1200 | 900 | 5.4 | <u>550</u> | 1.2 | |
| 36 | B | 1210 | 880 | 5.0 | <u>760</u> | 3.5 | |
| 37 | C | 1220 | 860 | 3.4 | 675 | 4.2 | |
| 38 | C | 1210 | 910 | 2.3 | <u>540</u> | <u>10.6</u> | |
| 39 | D | 1220 | 900 | 4.0 | 690 | 5.6 | |
| 40 | D | 1230 | 890 | 5.6 | 730 | 7.6 | Hot-rolled material with scale |
| 41 | D | 1190 | 950 | 2.7 | 630 | 5.2 | Dimension: Φ60.5 × 2.6t, suspension arm |
| 42 | D | 1210 | 880 | 2.2 | 620 | 2.6 | Cold-rolled annealed black plate |
| 43 | D | 1270 | 830 | 6.1 | 630 | — | Press forming and welding |
| 44 | D | 1200 | 850 | 3.4 | 690 | — | Roll forming and welding |
| 45 | D | 1280 | 900 | 6.0 | 610 | 3.5 | Surface-treated black plate (Zn-based) |
| 46 | D | 1260 | 940 | 2.5 | 670 | 5.4 | Surface-treated black plate (Al-based) |
| 47 | D | 1230 | 900 | 3.6 | 650 | 3.6 | Zn plating after tube making |
| 48 | D | 1240 | 960 | 5.9 | 590 | — | Hot-reduced pipe material (reduction rate: 70%) |
| 49 | D | 1220 | 870 | 4.6 | 570 | — | Warm-reduced pipe material (reduction rate: 70%) |
| 50 | D | 1250 | 830 | 8.5 | 650 | 5.2 | Quenching during forming |
| 51 | D | 1220 | 910 | 5.3 | 620 | 2.3 | Shot blasting after quenching |
| 52 | D | 1260 | 840 | 5.1 | 645 | 2.6 | Shot peening after quenching |

TABLE 6

| No. | Steel | Ferrite grain diameter corresponding to circle, df (μm) | Second phase grain diameter corresponding to circle, ds (μm) | Ferrite volume fraction Vf (%) | Elongation of untreated tube El (%) | Cross-section hardness after quenching HV (10) | Completely reversed plane bending fatigue endurance (MPa) | Fracture appearance transition temperature in Charpy impact test vTrs (° C.) | Four-point bending failure time in 0.1N hydrochloric acid (h) | Corrosion fatigue endurance | |
|---|---|---|---|---|---|---|---|---|---|---|---|
| 27 | A | 5.4 | 3.6 | 86 | 25 | 444 | 506 | −90 | >200 | ○ | This invention |
| 28 | A | <u>14.3</u> | <u>13.5</u> | 68 | <u>19</u> | 415 | <u>442</u> | −70 | >200 | ○ | Comp. example |
| 29 | A | 2.6 | 2.1 | 85 | 23 | 435 | 512 | −85 | >200 | ○ | This invention |
| 30 | A | <u>15.2</u> | <u>12.8</u> | 75 | <u>19</u> | 408 | <u>436</u> | −75 | >200 | ○ | Comp. example |
| 31 | A | <u>13.5</u> | 6.8 | 77 | <u>16</u> | 415 | <u>426</u> | −65 | >200 | ○ | Comp. example |

TABLE 6-continued

| No. | Steel | Ferrite grain diameter corresponding to circle, df (μm) | Second phase grain diameter corresponding to circle, ds (μm) | Ferrite volume fraction Vf (%) | Elongation of untreated tube El (%) | Cross-section hardness after quenching HV (10) | Completely reversed plane bending fatigue endurance (MPa) | Fracture appearance transition temperature in Charpy impact test vTrs (° C.) | Four-point bending failure time in 0.1N hydrochloric acid (h) | Corrosion fatigue endurance | |
|---|---|---|---|---|---|---|---|---|---|---|---|
| 32 | B | 6.5 | 5.2 | 56 | 23 | 445 | 523 | −80 | >200 | ○ | This invention |
| 33 | B | 9.5 | 8.5 | 25 | 17 | 442 | 436 | −75 | >200 | ○ | Comp. example |
| 34 | B | 6.5 | 5.2 | 54 | 24 | 449 | 513 | −80 | >200 | ○ | This invention |
| 35 | B | 7.5 | 13.5 | 24 | 17 | 452 | 425 | −70 | >200 | ○ | Comp. example |
| 36 | B | 16.9 | 12.8 | 77 | 21 | 415 | 398 | −55 | >200 | ○ | Comp. example |
| 37 | C | 2.3 | 1.9 | 91 | 26 | 425 | 514 | −95 | >200 | ○ | This invention |
| 38 | C | 2.5 | 1.7 | 90 | 15 | 433 | 444 | −80 | >200 | ○ | Comp. example |
| 39 | D | 6.2 | 4.8 | 90 | 26 | 442 | 525 | −95 | >200 | ○ | This invention |
| 40 | D | 5.4 | 4.9 | 85 | 25 | 426 | 502 | −90 | >200 | ○ | This invention |
| 41 | D | 5.5 | 3.8 | 87 | 25 | 435 | 514 | −85 | >200 | ○ | This invention |
| 42 | D | 8.4 | 6.8 | 92 | 27 | 418 | 510 | −85 | >200 | ○ | This invention |
| 43 | D | 6.2 | 5.1 | 85 | 24 | 415 | 501 | −85 | >200 | ○ | This invention |
| 44 | D | 5.8 | 4.7 | 85 | 26 | 427 | 502 | −80 | >200 | ○ | This invention |
| 45 | D | 6.8 | 5.7 | 88 | 24 | 415 | 522 | −85 | >200 | ○ | This invention |
| 46 | D | 7.2 | 5.9 | 88 | 23 | 429 | 517 | −80 | >200 | ○ | This invention |
| 47 | D | 5.6 | 4.8 | 86 | 23 | 436 | 524 | −80 | >200 | ○ | This invention |
| 48 | D | 7.8 | 3.5 | 86 | 27 | 408 | 511 | −85 | >200 | ○ | This invention |
| 49 | D | 8.6 | 2.9 | 91 | 28 | 409 | 513 | −80 | >200 | ○ | This invention |
| 50 | D | 5.9 | 5.7 | 84 | 25 | 411 | 495 | −75 | >200 | ○ | This invention |
| 51 | D | 6.3 | 5.9 | 85 | 22 | 416 | 533 | −80 | >200 | ○ | This invention |
| 52 | D | 5.2 | 4.1 | 89 | 26 | 452 | 532 | −80 | >200 | ○ | This invention |

The invention claimed is:

1. A steel for structural parts of automobiles having excellent formability, fatigue endurance after quenching, low temperature toughness, and resistance for hydrogen embrittlement, wherein the steel has a composition containing, by mass, the following:
C: 0.18 to 0.29%
Si: 0.06 to 0.45%
Mn: 0.91 to 1.85%
P: 0.019% or less
S: 0.0029% or less
Sol. Al: 0.015 to 0.075%
N: 0.0049% or less
O: 0.0049% to 0.0008%
B: 0.0008 to 0.0018%
Nb: 0.001 to 0.019%
Ti: 0.001 to 0.029%
Cr: 0.001 to 0.195%
Mo: 0.001 to 0.195%
so that the carbon equivalent Ceq defined by the equation (1) below satisfies a value of 0.4 to less than 0.58, and the total x of multiplying factors including that for B according to Grossmann satisfies a value of 1.2 to less than 1.7, the balance being substantially composed of Fe, and the steel also has a structure in which the ferrite grain diameter df corresponding to a circle is 3.4 μm to 7.9 μm, the ferrite volume fraction Vf is 30% to less than 98% and the fatigue endurance after quenching is 500 MPa or more:

$$Ceq=C+Mn/6+Si/24+Ni/40+Cr/5+Mo/4+V/14 \quad (1)$$

wherein C, Mn, Si, Ni, Cr, Mo, and V represent the contents (% by mass) of the respective elements.

2. The steel for structural parts of automobiles according to claim 1, further comprising, by mass, at least one selected from 0.001% to 0.175% of Cu and 0.001% to 0.145% of Ni in addition to the above composition.

3. The steel for structural parts of automobiles according to claim 1 or 2, further comprising 0.0001% to 0.0029% by mass of Ca in addition to the above composition.

4. A steel composition containing, by mass, the following:
C: about 0.18 to about 0.29%
Si: about 0.06 to about 0.45%
Mn: about 0.91 to about 1.85%
P: about 0.019% or less
S: about 0.0029% or less
Sol. Al: about 0.015 to about 0.075%
N: about 0.0049% or less
O: about 0.0049% to 0.0008%
B: about 0.0001 to about 0.0029% 0.0008 to 0.0018%
Nb: about 0.001 to about 0.019%
Ti: about 0.001 to about 0.029%
Cr: about 0.001 to about 0.195%
Mo: about 0.001 to about 0.195%
so that the carbon equivalent Ceq defined by the equation (1) below satisfies a value of about 0.4 to less than about 0.58, and the total x of multiplying factors including that for B according to Grossmann satisfies a value of about 1.2 to less than about 1.7, the balance being substantially composed of Fe, and the steel also has a structure in which the ferrite grain diameter df corresponding to a circle is about 3.4 μM to 7.9 μm, and the ferrite volume fraction Vf is about 30% to less than about 98% and the fatigue endurance after quenching is 500 MPa or more:

$$Ceq=C+Mn/6+Si/24+Ni/40+Cr/5+Mo/4+V/14 \quad (1)$$

wherein C, Mn, Si, Ni, Cr, Mo, and V represent the contents (% by mass) of the respective elements.

5. The steel according to claim 4, further comprising, by mass, at least one selected from about 0.001% to about 0.175% of Cu and about 0.001% to about 0.145% of Ni in addition to the above composition.

6. The steel according to claim 4 or 5, further comprising about 0.0001% to about 0.0029% by mass of Ca.

* * * * *

UNITED STATES PATENT AND TRADEMARK OFFICE
CERTIFICATE OF CORRECTION

PATENT NO.        : 8,747,578 B2                                    Page 1 of 1
APPLICATION NO.   : 10/582717
DATED             : June 10, 2014
INVENTOR(S)       : Toyoda et al.

It is certified that error appears in the above-identified patent and that said Letters Patent is hereby corrected as shown below:

In the Claims:

<u>In Column 22</u>

At line 42, please delete "about 0.0001 to about 0.0029%".

Signed and Sealed this
Twenty-fourth Day of February, 2015

Michelle K. Lee
*Deputy Director of the United States Patent and Trademark Office*